May 8, 1923.
H. G. BARTHOLOMEW
1,454,719
FACSIMILE TRANSMISSION SYSTEM
Filed May 18, 1922
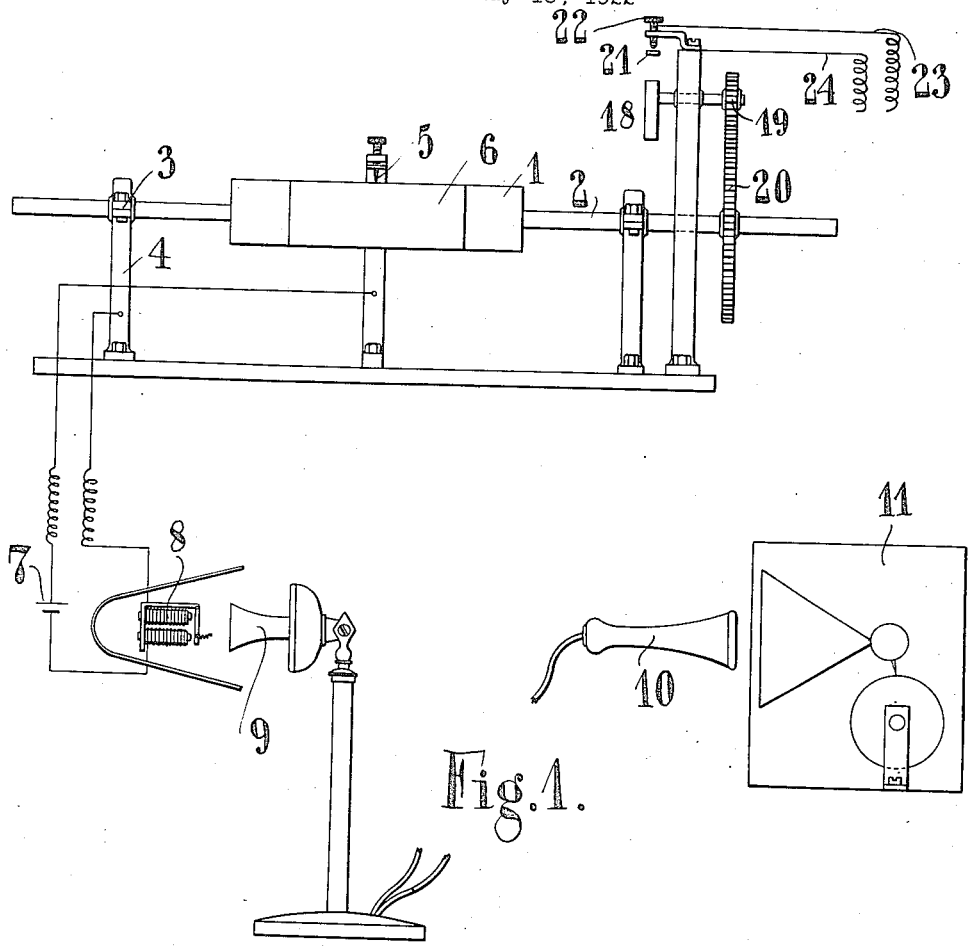
Fig.1.
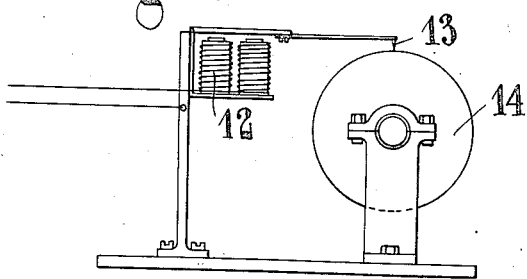
Fig.2.
Fig.3.
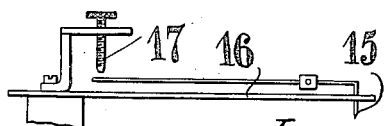
Inventor
H.G. Bartholomew
By Marks & Clerk Attys Patented May 8, 1923.

1,454,719

UNITED STATES PATENT OFFICE.

HARRY GUY BARTHOLOMEW, OF LONDON, ENGLAND.

FACSIMILE TRANSMISSION SYSTEM.

Application filed May 18, 1922. Serial No. 561,911.

*To all whom it may concern:*

Be it known that I, HARRY GUY BARTHOLOMEW, a subject of the King of Great Britain and Ireland, and residing at 23 to 29 Bouverie Street, London, E. C. 4, England, have invented certain new and useful Improvements in and Relating to Facsimile Transmission Systems, (for which an application has been filed in Great Britain No. 10,803, dated 13th April, 1921), of which the following is a specification.

This invention relates to facsimile transmission and has for its object to provide improvements therein.

The invention consists broadly in causing at the transmitting station a representation of the matter to be reproduced to operate a sound producing device in order to produce sound signals, transmitting the sound signals to the receiving station and reproducing the representation by means operated by the sound signals.

Thus, in accordance with the invention the representation of the matter to be reproduced may be one in which the variation in optical tones is represented by variation in character of the surface, as is the case for instance in a half-tone or other etched plate produced by photo-mechanical processes of reproduction.

The sound producing device may be of the character of a talking machine sound box in that a jewel or needle bearing upon the representation between which and the jewel or needle relative motion takes place causes sound to be produced by, for instance, the flexure of a diaphragm.

Relative motion between the surface on which the representation is formed and the jewel or needle may be effected in any suitable manner. The representation may, for instance, be bent into the form of a cylinder and by means of a leading screw the needle or jewel of the sound producing device may be caused to travel over the representation in a helical path.

The sound produced by the relative motion between the surface on which the representation is formed and the jewel or needle will vary in character according to the size of the dots when the representation is in the form of an etched metal plate such as would be used in forming a half-tone print and when the sound is transmitted to a suitable recording device a corresponding representation may be formed.

Ordinarily the sound will be transmitted by telephony with or without the employment of wires between the transmitting and receiving stations and at the latter a recording device which may generally resemble a talking machine recorder may be used for cutting or forming the representation on, for instance, a cylinder of suitable material, the tool of the recording instrument forming thereon dots or pits which in depth or size should correspond with the dots or pits on the representation at the transmitting station.

Preferably the variation in character of the surface of the representation is employed to control the supply of current to an electrically controlled or operated sound producing device.

The sound signals thus produced may be transmitted by telephony to the receiving station and the signals received as sound being recorded by a sound recording device.

Alternatively, the sound signals may operate a telephone transmitter in circuit with a device at the receiving station adapted to record the signals otherwise than in a form corresponding with sound waves.

While in certain cases it may be found convenient to use an etched metal plate as the representation operated on by the sound producing device, in others an impression or mould thereof produced in a plastic composition such as the so-called wax employed in forming phonograph records may be used should it be found more convenient to form, for instance, a representation on the surface of a cylinder by this means.

The following particulars are given by way of example to illustrate certain modes of carrying the invention into effect, reference being had to the accompanying drawings in which:—

Figure 1 represents diagrammatically the apparatus at the transmitting and receiving stations designed to transmit the sound signals and to receive the signals as sound waves and to form a record adapted to reproduce the signals as sound;

Figure 2 represents diagrammatically an apparatus for use at the receiving station for recording the tone signal in the form of depressions of varying length, such depressions not having the hill-and-dale or sinuous character of the records of sound signals, while Figure 3 represents a reading stylus for use with records formed by the device illustrated in Figure 2.

In the drawing, referring to Figure 1, 1 is a mandrel mounted on the spindle 2, one end of which is in the form of a lead screw engaged in a nut 3 formed in the head of the standard 4, whereby the mandrel is caused by its rotation by a suitable source of power to move endwise, thus causing the style 5 to trace a helical path over the representation 6 of the subject to be transmitted which may be in the form of a half-tone plate bent round the mandrel and suitably secured thereto. The stylus is in electrical connection with a battery 7 or other source of current which in turn is in series with an electrically operated sound producing device 8 associated with a sound amplifier, the device 8 being in electrical connection with the mandrel and the representation mounted thereon.

As the representation is moved relatively to the stylus the latter will make contact at intervals with the dots of which the half-tone representation is composed and according to the size of the latter current will be transmitted for greater or less periods of time to the sound producing device 8 which will therefore emit sound signals of greater or less duration.

The sound signals will operate the telephone transmitter 9, which, being in electrical connection with the receiver 10 at the receiving station, will cause the signals to be reproduced and the recording device 11 of the character of a talking machine will record the signals.

The visual reproduction of the representation may be formed by the aid of the record of the sound signals by operating thereon by a device of the general character of a sound reproducer such as is used in talking machines, the vibrations imparted to the stylus or needle of the reproducer being, for instance, caused to operate a sparking device or other means adapted to illuminate to a greater or less extent or for a longer or shorter period successive areas of a light sensitive surface to produce thereon in the order necessary to form a visual reproduction light affected areas of varying tone or magnitude.

Referring to Figure 2, 12 is an electromagnet provided with a resiliently supported armature adapted to vibrate sluggishly relative to the electrically operated sound producing device. This electromagnet is in circuit with a telephone transmitter as in the construction illustrated in Figure 1, and the armature is provided with a stylus 13 adapted when current is passed through the magnet to cut into the cylinder of wax or other suitable composition 14. With this construction the depressions formed in the wax will not have a wavy or sinuous character corresponding with the form of the sound waves set up by the electrically operated sound producing device.

In reading the record in order to produce a visual reproduction of the representation operated on at the transmitting station, the device illustrated in Figure 3 may be employed, the style 15 being mounted in an arm 16 in such manner that it will make and break an electrical circuit through the screw contact 17, said circuit being adapted to control the movement of a light sensitive surface (not shown).

Control signals may be communicated from the transmitting to the receiving station at intervals as proposed in the specifications of British Letters Patent No. 24825 of 1921 and No. 3982 of 1922 after each narrow zone or fraction thereof is transmitted.

For this purpose circuit controlling contacts operated at a speed suitably related with the speed of rotation of the mandrel may be associated with the transmitting instrument as suggested in Fig. 1 wherein 18 is a cam driven from the mandrel spindle through the wheels 19 and 20 at a suitable speed, adapted to cause the flexible contact member 21 to contact with the screw contact 22 to close the circuit indicated by the conductors 23, 24, and effect the operation of a recording device not shown for the control signals at the receiving station to enable the speed of operation of the recording device for the tone signals to be controlled on the basis of the control signals or directly to control its operation.

It is to be understood that the invention is not limited to the employment of representations of the character of half-tone blocks or to the use of a single representation of the subject to be transmitted, but includes broadly all methods of facsimile transmission in which a representation of a subject is employed for controlling sound signals representing tone values.

Having now described my invention, what I claim as new and desire to secure by Letters Patent is:—

1. The herein described process of facsimile transmission consisting in translating a pictorial representation to operate a sound producing device in order to produce sound signals, translating said sound signals into current impulses and transmitting said current impulses to a receiving station, and reproducing the sound signals at said receiving station and re-translating the sound signals to produce a reproduction of the pictorial representation.

2. An apparatus for the transmission of facsimile comprising an electrically operated sound producing device operable to translate a pictorial representation into sound signals, a receiving station, telephonic means for translating said sound signals into current impulses and for transmitting said current impulses to said receiving station, and means at said receiving station for reproducing the sound signals and re-translating the latter to reproduce the pictorial representation.

In testimony whereof I have signed my name to this specification.

HARRY GUY BARTHOLOMEW.